Aug. 11, 1931.  S. DICKSTEIN ET AL  1,818,609
AUTOMATIC GAS HOSE SHUT-OFF DEVICE
Filed April 10, 1929
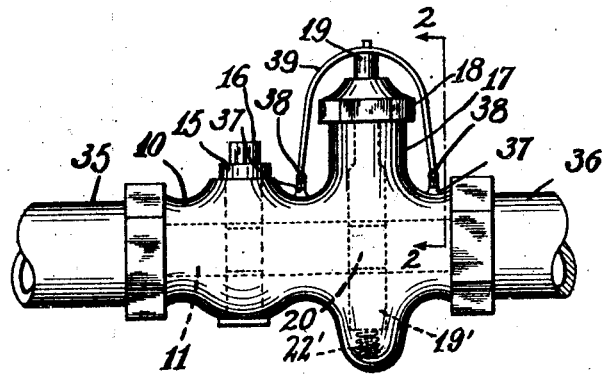//
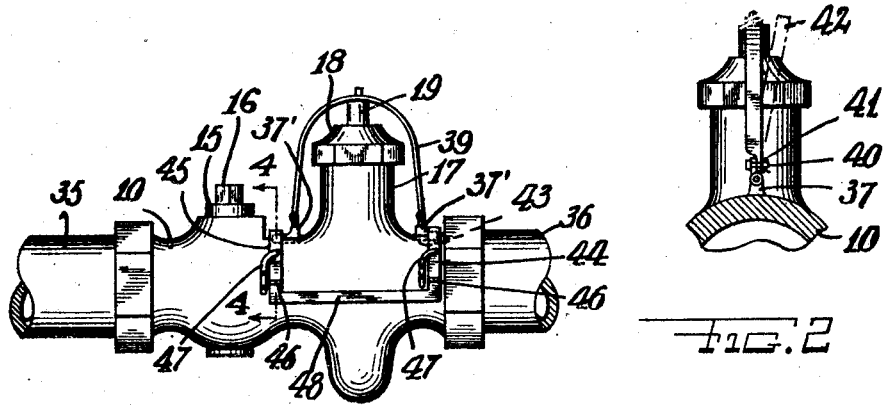
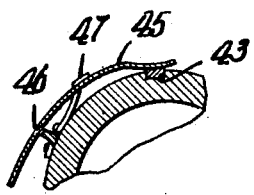
INVENTORS
Samuel Dickstein
Louis H. Weinstein
BY
ATTORNEY Patented Aug. 11, 1931

1,818,609

UNITED STATES PATENT OFFICE

SAMUEL DICKSTEIN AND LOUIS H. WEINSTEIN, OF NEW YORK, N. Y.

AUTOMATIC GAS HOSE SHUT OFF DEVICE

Application filed April 10, 1929. Serial No. 353,930.

This invention relates generally to safety devices and has more particular reference to a novel automatic gas or air hose cock.

The invention has for an object the provision of a device of the class mentioned, which is of simple and durable construction, desirable in use and efficient in action, and which can be manufactured and sold at a reasonable cost.

The invention comprises a device in which the automatically closing valve is to be held in an open position by a fuse strip engaging the stem of the valve and held stationary at both ends.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:—

Fig. 1 is a side elevational view of the device constructed according to this invention.

Fig. 2 is a fragmentary vertical sectional view taken on the line 2—2 of Fig. 1.

Fig. 3 is a view similar to Fig. 1 but illustrating a modification.

Fig. 4 is a fragmentary sectional view taken on the line 4—4 of Fig. 3.

The reference numeral 10 indicates generally a cock body formed with a central passage 11.

A rotatable control valve 15 engages within the body 10 and is arranged for closing the passage 11. This valve is of customary construction and is manually operable by turning the handle 16.

The body 10 is provided with a neck 17 having external threads and a cap 18 threadedly engaged thereon. A slidable valve 19 engages within the body 10 and has a valve opening 20 for completing the passage 11 when the valve is in an inner position.

The manually operable valve 15 and the automatically operable valve 19 are housed in a common body connected with a main gas line 35 and with a line 36 for connection with a gas meter, gas range or other outlet. The valve body is provided with a pair of lugs 37 having universal joints at their tops as indicated at 38 and a fuse strip 39 is bent across the top of the stem of the valve 19 and secured at the ends to the universal joints 38, the securing being accomplished by pintle pins 40 held against displacement by cotter pins 41. The valve stem may be slightly depressed for freeing it from the fuse strip 39 and the fuse strip moved to position as indicated by dot and dash lines 42 so that the automatic valve 19 may close and cut off the supply of gas. Valve spring 22' is adapted to engage the bottom of valve 19', normally urging the valve into closed position.

In the modified form of the device illustrated in Figs. 3 and 4, lugs 37' have been shown separate from the valve body and engaged in grooves 43 formed in the body. The arms 44 and 45 of a U lever normally hold the lugs 37' in fixed positions on the valve body. The U lever is pivoted as at 46 and normally urged into operative position by flat springs 47 mounted upon the valve body. The connector portion 48 of the U lever may be manually depressed for raising the arms 44, 45 so that the lugs 37' may be removed from the grooves 43 and the valve 19 permitted to automatically close.

In the event of a fire the fuse strip 39 readily melts and frees the valve's stem which is then automatically moved upwards for cutting off the supply of gas. The manually operable valve 15 may be operated for also closing the supply of gas in event repairing is to be done and it is necessary to cut off the gas.

While we have shown and described the preferred embodiments of our invention, it is to be understood that we do not limit ourselves to the precise construction herein disclosed and the right is reserved to all changes and modifications coming within the scope of the invention as defined in the appended claims.

Having thus described our invention, what we claim as new, and desire to secure by United States Letters Patent is:—

1. A device of the class described, comprising a valve body, an automatically closing valve therein, lugs projecting from the body, and a fuse strip extended over the valve stem for holding the valve in an open position, and universal joints connecting the ends of the strip with the lugs.

2. A device of the class described, comprising a valve body, an automatically closing valve therein, lugs projecting from the body, and a fuse strip extended over the valve stem for holding the valve in an open position, and universal joints connecting the ends of the strip with the lugs, pintle pins being used for holding the ends of the strip onto the joints.

3. In a valve device of the class described, an automatically closing valve, a fusible strip holding said automatically closing valve open, lugs connected with the ends of the strip, a U lever pivotally mounted on the valve body and having arms engaging against the lugs and arranged for holding the lugs on the valve body, and means for urging the arms against the said lugs.

4. In a valve device of the class described, an automatically closing valve having a fusible strip holding said automatically closing valve open, lugs connected with the ends of the strip, a U lever pivotally mounted on the valve body and having arms engaging against the lugs and arranged for holding the lugs on the valve body, and means for urging the arms against the said lugs, comprising flat springs engaging between the valve body and the arms.

In testimony whereof we have affixed our signatures.

SAMUEL DICKSTEIN.
LOUIS H. WEINSTEIN.